(No Model.)
A. K. McMURRAY.
Table Beverages.
No. 242,213.  Patented May 31, 1881.
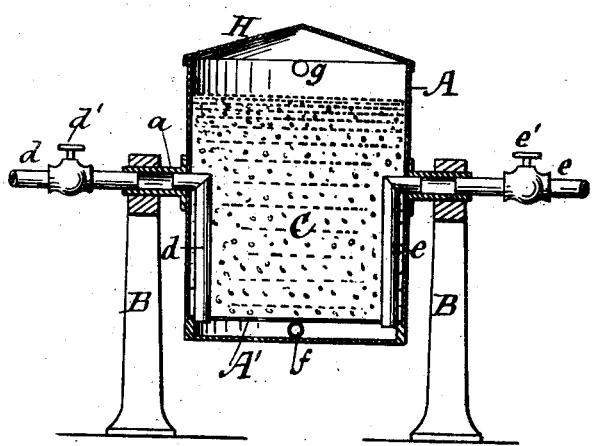
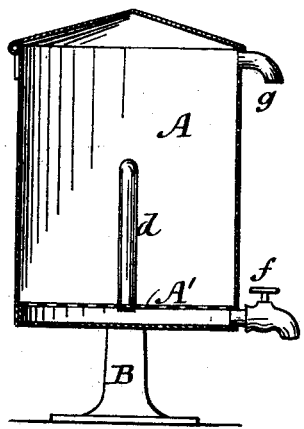
Witnesses:
W B Masson
W. E. Bowen
Inventor:
Albert K. McMurray
by E. E. Masson
atty.

UNITED STATES PATENT OFFICE.

ALBERT K. McMURRAY, OF BALLSTON, N. Y., ASSIGNOR TO HANNAH E. Mc. MURRAY, GEORGE R. BEACH, AND HENRY CLARK, OF SAME PLACE.

TABLE BEVERAGE.

SPECIFICATION forming part of Letters Patent No. 242,213, dated May 31, 1881.

Application filed January 15, 1881.

*To all whom it may concern:*

Be it known that I, ALBERT K. MCMURRAY, of Ballston, in the county of Saratoga and State of New York, have invented an improved process and compound for treating wheat to be used for making a table beverage, of which the following is a specification.

A table beverage having a flavor resembling coffee and constituting a healthful, nutritious, and pleasant substitute therefor has long been desired by those who are unable to drink genuine coffee. Various substances have been tried and proved unsatisfactory, either on account of their flavor, taste, or liability to become sour or rancid when kept for a length of time. Wheat, among other cereals, has been tried, but if simply roasted the oily granules in its outer covering will soon become rancid and spoil the flavor of the beverage produced therewith.

Various processes have been used to remove the oily substance from wheat. For example, it has been soaked in a weak solution of bicarbonate of soda and then in cold water once or twice, after which it has been subjected to steam or to a very limited amount of hot water to cook it, and then exposed to the air for a few days, dried, and at last roasted.

By the above alkaline process a portion of the oil in the germ and under the outer integument of each grain of wheat is released and left free in the mass. The cells of said integument thus opened render the latter spongy and ready to reabsorb the soapy compound if not entirely removed by a large quantity of water passing rapidly through the mass, with either artificial stirring or the friction caused by a large amount of water in motion acting thereupon.

The object of my improvement is to remove from a mass of wheat subjected to an alkaline bath the whole oily matter contained therein by suitable means, as hereinafter described, and to make this alkaline bath out of substances that will improve the flavor of the roasted grain or of the beverage made therefrom.

The invention will first be described in connection with the drawings, and then pointed out in the claims.

In the accompanying drawings, Figure 1 represents a vertical section of the apparatus used with my process. Fig. 2 represents another vertical section of the same at right angles to the first.

In said drawings, A represents a cask or tank capable of holding three or four barrels, (more or less.) It is provided with hollow trunnions $a$, resting in a frame or standard, B. The tank A is provided with a screen or perforated partition, A', a few inches above the bottom thereof, upon which is to be placed a suitable quantity of wheat, C.

Pipes $d$ and $e$ pass through the hollow trunnions, (or are secured on each side thereof,) and entering the tank extend down through and under the perforated partition A'. The pipe $d$ is connected with a water-reservoir or a pump, and is controlled by a cock, $d'$. The pipe $e$ is connected with a steam-boiler, and is also provided with a cock, $e'$.

The bottom of the tank is provided with a cock, $f$, that can be opened to let out the liquid that may be placed in the tank; and at the upper portion of said tank there is an overflow-pipe, $g$, having a screen in front of its inner opening for the purpose of retaining the grain and letting out the water, as hereinafter described.

The tank is provided with a suitable cover, H, preferably hinged to one side thereof.

I will now describe the manner in which my invention is carried out.

All the cocks being closed, the wheat is placed in the cask A and covered with a mixture of scorched molasses, water, and potash, in the proportion of five gallons of molasses, ten gallons of water, and half a pound of potash. The molasses is scorched previously by stirring it with a piece of iron of a suitable size at a red heat. This mode is preferred as being the simplest; but it may be scorched otherwise. The wheat is left to soak therein for about twelve hours, the alkaline mixture combining with the oily substance in the germ and covering of the grain, the aromatic saccharine properties of the scorched molasses penetrating within and permeating its body. The unabsorbed liquid is then drawn off through the cock $f$, after which said cock is closed, the water-cock $d'$ is opened, and a current of cold water is forced within for about forty-eight hours through the pipe $d$, entering under the perforated bottom $A'$ and escaping through the overflow-pipe $g$ at the top. After having thus thoroughly washed the wheat, the cold-water cock $d'$ is closed and the steam or hot-water cock $e'$ of the pipe $e$ is opened, admitting a current of steam or hot water through the perforated bottom $A'$ into the wheat, so as to have a portion of it overflow and escape through the pipe $g$. The wheat is thus boiled in a large amount of water (having a surplus thereof) for about two hours and a half and the whole of its oily substance removed. The whole operation—viz., soaking in scorched molasses and alkaline water, washing in a current of cold water, and boiling—is thus accomplished in the same tank, cask, or vat, without any removal or handling. The operation being thus advanced, the tank is half rotated upon its trunnions, the contents poured out, and dried as rapidly as possible with hot air to prevent fermenting. The wheat is then roasted until it assumes a light brown color. It is now ready to be ground for use, and when so ground will granulate as well as coffee, and will not become sour or rancid with age, the table beverage made therefrom being highly flavored, very palatable, nutritious, and healthful, as it is free from all objectionable properties.

Wheat prepared as above described is not intended to be mixed with or to form an adulteration of coffee, but to be used as a substitute therefor. The apparatus described therein being capable of use to wash and boil or steam other substances for food or beverages, I lay no claim thereto in this application.

Having now fully described my invention, I claim—

1. In preparing table beverages, the process of treating wheat, consisting in first soaking it in a mixture of scorched molasses, water, and potash, subjecting it to a current of cold water, and afterward exposing it to a current of hot water to cook the same, and then drying and finally roasting the wheat, substantially as and for the purpose described.

2. The herein-described mixture for treating wheat in preparing the same for use as a table beverage, consisting of scorched molasses, water, and potash, in the proportions specified.

ALBERT K. McMURRAY.

Witnesses:
JAMES H. LOWELL,
JOHN H. DICKINSON.